United States Patent
Bayya et al.

(10) Patent No.: US 9,809,501 B2
(45) Date of Patent: Nov. 7, 2017

(54) CALCIUM LANTHANOID SULFIDE POWDERS, METHODS OF MAKING, AND CERAMIC BODIES FORMED THEREFROM

(75) Inventors: Shyam S. Bayya, Ashburn, VA (US); Woohong Kim, Lorton, VA (US); Jasbinder S. Sanghera, Ashburn, VA (US); Guillermo R. Villalobos, Springfield, VA (US); Ishwar D. Aggarwal, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1142 days.

(21) Appl. No.: 12/691,075

(22) Filed: Jan. 21, 2010

(65) Prior Publication Data
US 2011/0174989 A1    Jul. 21, 2011

(51) Int. Cl.
C04B 35/51 (2006.01)
C04B 35/547 (2006.01)
B82Y 30/00 (2011.01)
C01F 17/00 (2006.01)
(Continued)

(52) U.S. Cl.
CPC .......... *C04B 35/547* (2013.01); *B82Y 30/00* (2013.01); *C01F 17/0037* (2013.01); *C04B 35/62665* (2013.01); *C04B 35/645* (2013.01); *C01P 2002/72* (2013.01); *C01P 2004/03* (2013.01); *C01P 2004/64* (2013.01); *C01P 2006/12* (2013.01); *C01P 2006/80* (2013.01); *C04B 2235/3208* (2013.01); *C04B 2235/3224* (2013.01); *C04B 2235/3227* (2013.01); *C04B 2235/443* (2013.01); *C04B 2235/5409* (2013.01); *C04B 2235/5454* (2013.01); *C04B 2235/658* (2013.01); *C04B 2235/72* (2013.01);
(Continued)

(58) Field of Classification Search
USPC ......................................................... 501/152
See application file for complete search history.

(56) References Cited

U.S. PATENT DOCUMENTS

| 4,579,882 A * | 4/1986 | Kanbe ...................... H01B 1/22 252/513 |
| 4,619,792 A * | 10/1986 | Saunders et al. ............. 264/1.22 |
| 2009/0004098 A1 * | 1/2009 | Schmidt et al. .............. 423/608 |

OTHER PUBLICATIONS

Tethis Lab, "Nanopowder Synthesizer nps10", (Company literature).*

(Continued)

*Primary Examiner* — Rafferty Kelly
(74) *Attorney, Agent, or Firm* — US Naval Research Laboratory; Rebecca L. Forman (57) ABSTRACT

A method of preparing a fine powder of calcium lanthanoid sulfide is disclosed. The method includes spraying soluble calcium and lanthanoid salts into at least one precipitating solution to form a precipitate comprising insoluble calcium and lanthanoid salts, optionally, oxidizing the precipitate comprising insoluble calcium and lanthanoid salts, and sulfurizing the optionally oxidized precipitate to form a fine powder of calcium lanthanoid sulfide. An alternative method for forming the powder is by flame pyrolysis. The calcium lanthanoid sulfide powder produced by either method can have an impurity concentration of less than 100 ppm, a carbon concentration of less than 200 ppm, a BET surface area of at least 50 m²/g, and an average particle size of less than 100 nm.

20 Claims, 5 Drawing Sheets (51) Int. Cl.
  *C04B 35/626* (2006.01)
  *C04B 35/645* (2006.01)
(52) U.S. Cl.
  CPC  *C04B 2235/721* (2013.01); *C04B 2235/9653* (2013.01); *C04B 2235/9661* (2013.01)

(56) References Cited

OTHER PUBLICATIONS

Tethis Lab, "Nanopowder Synthesizer nps10," (Company literature), Date unknown.
Hielscher, "Ultrasonic Devices to Disperse Nanomaterials," http://www.hielscher.com/ultrasonics/nano_01.htm, site visited Sep. 8, 2009.

* cited by examiner

CALCIUM LANTHANOID SULFIDE POWDERS, METHODS OF MAKING, AND CERAMIC BODIES FORMED THEREFROM

BACKGROUND

The present exemplary embodiment relates to a method of forming ultrafine, high purity calcium lanthanoid (e.g., La,Gd) sulfide powders. The powders find particular application in the formation of transparent ceramic materials with high mechanical strength for Long Wave Infrared (LWIR) sensor windows, and will be described with particular reference thereto. However, it is to be appreciated that the present exemplary embodiment is also amenable to other like applications.

Sensor systems for Long Wave Infrared (LWIR) that operate in the 8-12 µm range find application in armored transportation, air and naval vehicles, and in industrial control applications, among others. Such sensors may employ detectors based on mercury cadmium telluride (MCT) for detecting LWIR or MWIR (3-5 µm) radiation. The sensor is protected from the surrounding environment by an infrared-permeable window. Currently, windows are formed from single crystal ZnS, ZnSe and Ge. These materials suffer from various limitations. ZnS and ZnSe are soft materials and have poor environmental weatherability. Ge has poor strength, a high absorption coefficient, and becomes opaque at temperatures above 100° C.

Ceramic polycrystalline materials can be produced which have higher strength than conventional single crystal materials. However, such materials are generally poorly transparent in the LWIR range.

There remains a need for materials which are less susceptible to environmental problems for use in a variety of LWIR applications.

BRIEF DESCRIPTION

In accordance with one aspect of the exemplary embodiment, a method of preparing a fine powder of calcium lanthanoid sulfide includes spraying soluble calcium and lanthanoid salts into at least one precipitating solution to form a precipitate comprising insoluble calcium and lanthanoid salts, optionally, oxidizing the precipitate comprising insoluble calcium and lanthanoid salts, and sulfurizing the optionally oxidized precipitate to form a fine powder of calcium lanthanoid sulfide.

In another aspect, a calcium lanthanoid sulfide nanopowder is provided which includes an average particle size of less than 100 nm and further includes at least one of: an impurity concentration of less than 100 ppm, a carbon concentration of less than 200 ppm, and a BET surface area of at least 50 $m^2$/g.

In another aspect, a shaped ceramic body includes calcium lanthanoid sulfide as a predominant component, which is transparent in at least one of the LIR and MIR wavelength ranges.

In another aspect, a method of preparing a fine powder of calcium lanthanoid sulfide includes flame pyrolyzing a liquid comprising calcium and lanthanoid salts to form a mixture comprising oxides of calcium and the lanthanoid. The mixture is sulfurized to form a fine powder of calcium lanthanoid sulfide.

DETAILED DESCRIPTION

Methods of making sulfides of calcium and one or more lanthanoid (Ln) elements, such as lanthanum (La) and gadolinium (Gd), are disclosed herein.

Calcium lanthanum sulfide ($CaLa_2S_4$) (referred to herein as CLS) and calcium gadolinium sulfide ($CaGd_2S_4$) (CGS) are attractive as potential materials for IR windows since they are relatively transparent in the 8-12 µm wavelength region (Long Wave Infrared-LWIR) and 3-5 µm wavelength region (Medium Wave Infrared-MWIR). However, single crystal CGS and CLS are extremely difficult to grow in sizes of more than a few millimeters.

The exemplary embodiment provides CGS and CLS powders which can be used to make ceramic materials suitable as IR windows and which are transparent in at least one of the LIR and MIR wavelength ranges.

In existing powder forming methods, non-uniform agglomerated powders are formed. These powders, when used to make ceramics do not pack closely during green body processing, resulting in large voids. During the high temperature densification (sintering or hot pressing) process, high temperatures and long times are needed to reduce the size of these voids and it becomes difficult to completely eliminate them. This results in large exaggerated grains and residual porosity in the final ceramic, which results in scattering losses and poor transmission. Higher temperatures used during sintering also result in significant sulfur loss and make the samples black, requiring resulfurization. The exaggerated grains and porosity also result in poor strength of the ceramic.

The present powder forming method can overcome some or all these problems, enabling a transparent ceramic material, suited to use in IR windows for use in the 3-12 µm range, to be formed.

In one aspect of the exemplary embodiment, a method of forming ultrafine, high purity calcium lanthanoid (La,Gd) sulfide nano-powders without agglomeration is disclosed.

In another aspect of the exemplary embodiment, high purity calcium lanthanoid (La,Gd) sulfide nano-powders are disclosed which can have an impurity content (i.e., in terms of elements other than lanthanoid, calcium, sulfur, and carbon) of less than 100 ppm, expressed by weight. In some embodiments, the impurity content is less than 50 ppm, and in specific embodiments, less than 10 ppm. The carbon content of the nano-powders can be less than 300 ppm, and in one embodiment, less than 200 ppm. The ultrafine calcium lanthanoid sulfide ceramic nano-powders can be formed without agglomeration. By agglomeration it is meant that the particles are held together and do not readily realign to form a densely packed green body.

By nanopowder, it is meant a powder substantially comprised (e.g., >99% by weight) of nanoparticles. Nanoparticles, as used herein, are particles with a particle size (diameter or average dimension, if not spherical) of less than 1 µm. For example, the powder may have an average particle size of less than 100 nm (i.e., at least 50 wt % of particles have a diameter of less than 100 nm). In one embodiment, the powder may have an average particle size of 50-100 nm. In another embodiment, the powder may have an average particle size of less than 50 nm, e.g., 20-50 nm.

The exemplary CLS and CGS nanoparticles described herein allow dense packing of the powder during green body fabrication without creation of large voids. In addition, the large surface areas of the nanoparticles allow sintering to occur at significantly lower temperatures, driven by higher surface energy. This minimizes the sulfur loss, which could otherwise lead to blackening, and also avoids exaggerated grain growth during sintering. The powders thus enable the manufacture of transparent ceramic materials with high mechanical strength which are suited to use as LWIR and MWIR sensor windows for various commercial and military platforms.

In another aspect, a high-strength IR-transparent ceramic body is formed the exemplary fine powder. Such ceramic materials can be about 3-5 times stronger and harder than ZnS and ZnSe compounds currently in use. The exemplary ceramic materials can also have higher strength, when compared to Ge, and are stable at higher temperatures than Ge. Transparent polycrystalline CLS and CGS ceramics formed from the exemplary powders can thus provide IR windows for LWIR and MWIR applications. The ceramic body provides improved environmental durability for use as a window in sensor systems, enabling new commercial and military applications. It also has high mechanical strength for use in missile dome applications. Unlike single crystals, the ceramic body can have dimensions of several centimeters in the longest dimension.

In one aspect, the exemplary method includes co-precipitating lanthanoid and calcium cations as respective carbonates or oxalates from aqueous solutions followed by either directly sulfurizing the precipitate to form sulfide or going through an intermediate step of oxide formation and then sulfurizing to make nanometer size unagglomerated powder. The method includes use of ultrasonic energy during the coprecipitation step to break up agglomerates as they form. Alternatively, the calcium and lanthanoid cations are precipitated into separate solutions and the resulting precipitates combined.

The method also includes steps of treatment of the precipitate with liquid medium (or in combination with DI water), which is miscible with water. This technique provides convenient synthesis route to produce loosely bound precipitate, which in turn, results in uniform nano-sized powders upon calcination. The liquid medium used to wash the precipitate can be selected from any water-miscible medium/mediums. They include various organic and inorganic solvents.

Figure 1:
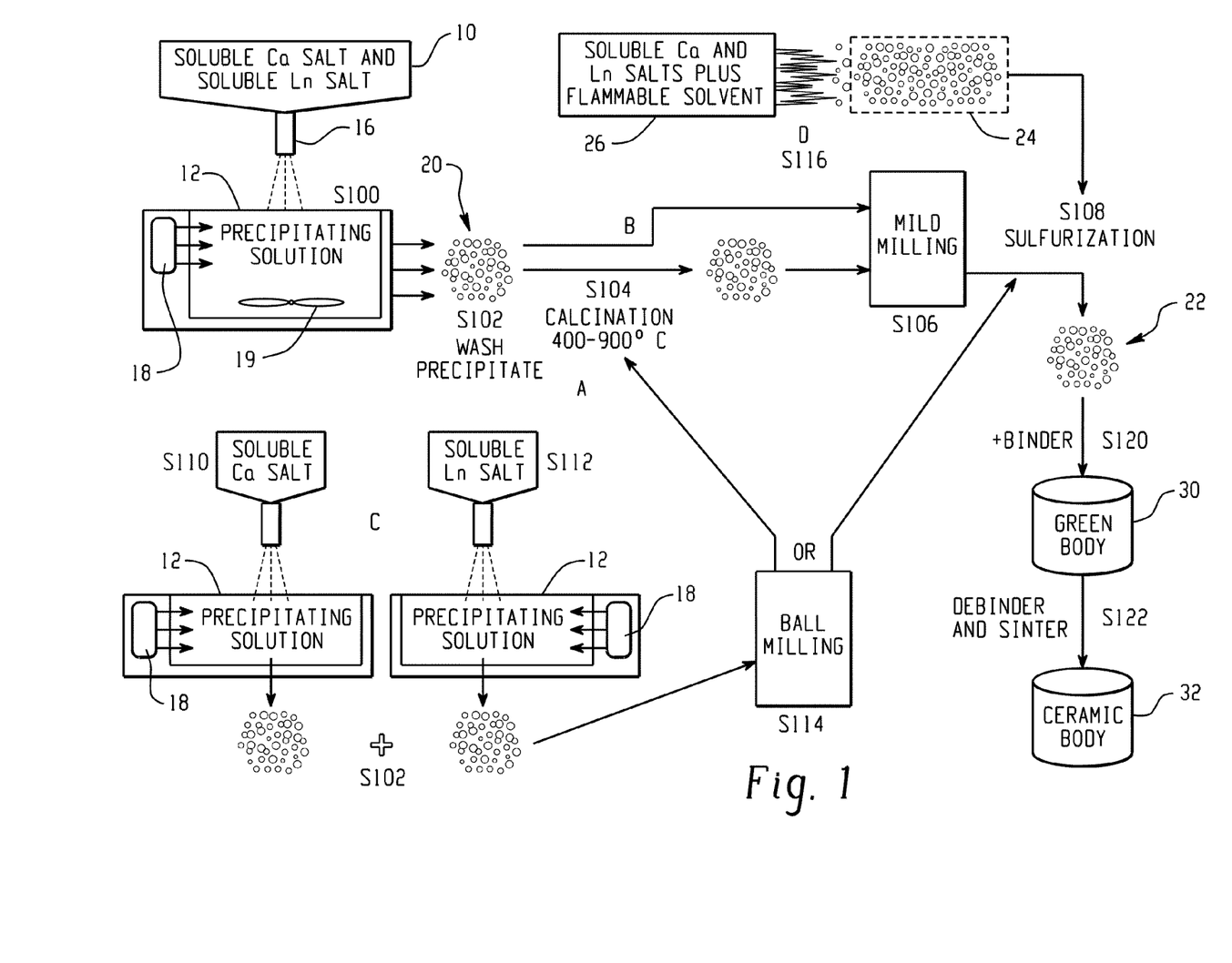
FIG. 1 schematically illustrates methods for forming calcium lanthanum sulfide and calcium gadolinium sulfide fine powders.

For example, as illustrated in FIG. 1, methods A and B proceed initially as follows: an aqueous solution 10 containing soluble salts of lanthanoid and calcium cations in a molar ratio of Ln:Ca of 2:1, corresponding to their molar ratios in the $CaLn_2S_4$ precipitate, is added as fine droplets to a precipitating solution 12 in a container 14 (S100). Alternatively, separate solutions of Ca and lanthanoid cations may be precipitated in the solution 12. As one example, the soluble salts may be nitrates of Ca and La and/or Gd in aqueous solution 10. The precipitating solution 12 can be an aqueous solution of ammonium carbonate/bicarbonate or ammonium oxalate or oxalic acid. The precipitating solution can be at room temperature or higher, e.g., from about 50-80° C. The nitrates of Ca and La/Gd can be atomized to form a mist in which the droplets are fine droplets of 1-20 µm. The atomizing can be performed using an ultrasonic atomizer (nebulizer) 16 and the resulting mist is sprayed into the precipitating solution 12. In this way, calcium and lanthanum or calcium and gadolinium can be chemically co-precipitated as carbonates or oxalates from aqueous solution 12. The solution is contained in an ultrasonic bath. Specifically, a source 18 of ultrasonic energy, such as an ultrasound generator marketed by Branson model B-3510DTH provides ultrasonic energy during the co-precipitation to break up agglomerates as they form. The ultrasonic energy can be in the range of 20 to 40 KHz e.g., 20 kHz. Vigorous mixing of the solution with a stirrer 19, as the lanthanoid and calcium nitrates are added, ensures a fresh surface is presented to the sprayed nitrate mist. Alternatively, the jets of up to 1000 km/hr produced by alternating high-pressure and low-pressure cycles during ultrasonic cavitation can be relied upon to mix the precipitating liquid.

The precipitate (carbonates or oxalates) 20 formed is filtered and a solvent exchange process is performed. This may include washing the precipitate 20 while it is still wet with an aprotic solvent to remove surface hydroxyl groups which may lead to agglomeration (through a condensation reaction) as water is removed. (S102). Two or more washings may be used. The aprotic solvent can be any organic solvent which reduces the surface hydroxyl groups, such as acetone; 1,4-dioxane; tetrahydrofuran (THF); dichloromethane; acetonitrile; dimethylformamide; dimethyl sulfoxide; and combinations thereof, although other polar aprotic solvents may alternatively or additionally be used. Even if the particles that have been solvent exchanged form agglomerates, they are only weakly held together in these, and can easily be dispersed with a mild milling. In contrast, hard agglomerations formed through condensation reactions tend to reduce the access of sulfur into the material in the sulfurizing step, making it more difficult to form a transparent body from the powder.

The washed precipitate 20 is dried to remove residual aprotic solvent, e.g., by drying in an oven, with a hotplate, or by spray drying. Optionally, a mild milling process is used to break up the resulting loosely packed powder cake.

In method A, precipitate 20 is then calcined (S104) to form oxide ($CaLn_2O_4$) and remove carbon. The lowest temperature possible to decompose the oxalate or carbonate to remove carbon may be selected for the calcination. Low temperature processing avoids formation of agglomerates. For example, a temperature of 400-900° C. may be used. Calcination is generally complete within about 12 hrs.

In method B, the calcination step is omitted. However, one problem with omitting calcination is that if the carbon is not removed completely during the subsequent sulfurization step (S108), it can result in reducing the powder and gives it a grey appearance instead of a beige color.

At S106, the calcined oxide product of method A or uncalcined oxalate or carbonate product of method B may undergo a mild milling. At S108, the precipitate of method A or B is sulfurized to form the CLS or CGS powder 22. The sulfurization may be performed by heating the powder in the presence of a sulfur-containing gas such as $H_2S$ or $CS_2$ gas to synthesize the nanoparticles 22 of CLS or CGS. Typical temperatures for the sulfurization may be from 700° C. to 1100° C., e.g., for 6 to 24 hours. Where $CS_2$ is used in the sulfurization process, it may be used in combination with $H_2S$. For example, the sulfurization gas is changed from $CS_2$ to $H_2S$ part way through the process. This has the effect of reducing the carbon content of the resulting product.

In another method (Method C), Ca and La or Gd oxalates are precipitated separately as shown at S110 and S112. This step is similar to step S100, except that the Ca nitrate and La or Gd nitrate are separately sprayed into carbonate/oxalate solutions. This step helps control the particle size of individual precipitates. In Methods A and B (co-precipitation process), based on the pH of the solution, the particle size of La or Gd oxalate can grow while the calcium oxalate is precipitating. The co-precipitation process may lead to large particles of La or Gd oxalate with fine particles of calcium oxalate. This is easily avoided in the separate precipitate method C.

The precipitates may be washed with an aprotic solvent and dried, as for S102 of method A. The two oxalate precipitates are mixed in the desired molar ratios (Ln:Ca of 2:1) by milling (S114). For example, the precipitates are ball milled together using $ZrO_2$ grinding media in a volatile liquid medium, such as ethanol, which is evaporated once the milling is complete. The method then proceeds to optional calcination and to sulfurization, as for S104-S106 of method A or B.

Methods A, B, and C can produce fine powders which are predominantly (e.g., >98%) in the $CaLn_2S_4$ phase, with little or no CaS, LnS, or lanthanoid oxysulfide ($Ln_2O_2S$).

In another embodiment for forming the powder 22 (Method D), flame spray pyrolysis is employed to prepare $CaLa_2S_4$ or $CaGd_2S_4$ nanopowders. In one embodiment propionates or other long chain organic precursors of Ca and La or Gd in which the lanthanoid and calcium cations are in a molar ratio of 2:1 (corresponding to their molar amounts in the mixed sulfide product) are sprayed through high temperature flame. Alternatively, La/Gd nitrate and calcium nitrate are used as the precursors in combination with a flammable solvent. Exemplary flammable organic solvents include ethanol and other $C_1$-$C_6$ alcohols, and acetone. During the pyrolysis process, the organic precursors/nitrates decompose and form nano-powders of oxides containing Ca and La/Gd ($CaLa_2O_4$ or $CaGd_2O$). These oxide precursors are sulfurized using $H_2S$ gas at high temperature to form $CaLa_2S_4$ or $CaGd_2S_4$ nano-powders.

A flame spray pyrolysis machine (such as that sold under the tradename NPS10, from Tethis, Italy) using a dispersion gas, such as oxygen, and a supporting flame gas, such as a mixture of methane and oxygen, is used to pyrolize the precursor solution (S116). An exemplary precursor solution flow rate is 1 ml~5 ml/min. The resulting nanopowder obtained from the filter 24 of the pyrolysis machine 26 can then be sulfurized, as for S108 of method A. This method can produce fine powders which are predominantly (e.g., >98%) $CaLn_2S_4$ with little or no CaS, LnS, or lanthanoid oxysulfide ($Ln_2O_2S$).

The CLS and CGS nano-powders 22 produced by methods A-C may have a BET surface area (measured as described below) of at least 5 $m^2/g$ and in one embodiment at least 50 $m^2/g$. The BET surface area can be up to 200 $m^2/g$, or higher. In general, larger surface areas (smaller particles) are favored by spray-drying the washed cake (in methods A and B).

The nano-powders 22 produced by these methods may have an average particle size of less than 100 nm (i.e., at least 50 wt % of particles have a diameter of less than 100 nm). In one embodiment, the powder may have an average particle size of less than 50 nm, e.g., 20-50 nm.

The nano-powders can have an impurity content of less than 50 ppm and a carbon content of less than 200 ppm.

The nano-powders produced are homogeneous without hard agglomeration. X-ray diffraction analysis of the powders shows them to be substantially in the CLS or CGS phase.

The nano-powder 22 thus formed can be used to form a shaped ceramic body comprising calcium lanthanoid sulfide as a major component, i.e., calcium lanthanoid sulfide is >50 wt. % of the body, e.g., >90 wt. %. The powder 22 can be predominantly in the calcium lanthanoid sulfide phase, e.g., the powder may be >98 wt. % calcium lanthanoid sulfide and up to at least 99.9 wt % or 100 wt %. In one embodiment, the powder 22 may be combined with a binder, such as ethylene glycol, and shaped, e.g., by being extruded, die pressed, or molded, then dried (S120) to form a green ceramic body 30. If a binder is used, the green ceramic body can be debindered, e.g., by heating, and sintered at a suitable temperature above 1000° C. for forming a transparent ceramic body 32 e.g., in a sulfur containing atmosphere, such as $H_2S$. The shaped body can have a smallest dimension of, for example, about 2-10 mm or more and a largest dimension in excess of 1 cm. The shaped ceramic body formed from the calcium lanthanoid sulfide powders is suited to fabrication of high performance LWIR windows and domes for military applications. It is non-porous to air (i.e., without pores extending through the body) and has an average IR transmission in the MIR and/or LIR of at least 60% for a body which is 1 cm in thickness. Most of the loss of transmission is due to reflection in air, which can be reduced if the transmitting medium is other media.

Without intending to limit the scope of the exemplary embodiments, the following examples demonstrate the formation of the exemplary powder 22.

EXAMPLES

Materials

For the following examples, the following materials were used:

Calcium nitrate (99.99% purity from Alfa AESAR).
Lanthanum nitrate (99.99% purity from Alfa AESAR)
Gadolinium nitrate, were used.
Ammonium bicarbonate (99.0%, Aldrich Chemical)

Characterization

BET surface area of the CLS/CGS nano-powders formed in the following examples was performed with nitrogen as the sorption gas using a MicroPorosimeter (Model # ASAP 2010 by Micromeritics, Norcross, Ga. 30093).

X-ray diffraction on the CLS/CGS nano-powder was performed using an X-ray diffractometer (Model XDS2000 by Scintag, Sunnyvale, Calif. 94086).

The powder morphology was determined using Scanning Electron Microscopy (LEO model #1550).

Chemical analysis was performed by Glow Discharge mass spectroscopy (GDMS).

Examples 2-6 and 10-11 are prophetic examples.

Example 1

Formation of CLS Nanopowder by Co-Precipitation

A mixed solution of calcium nitrate and lanthanum nitrate ($Ca^{2+}/La^{3+}$=1:2) was prepared in DI water by combining 0.1 mol. calcium nitrate and 0.2 mol lanthanum nitrate) and heated in a beaker. Fine droplets (1-20 μm) of the nitrate solution were sprayed, using an ultrasonic atomizer (Sonics & Materials Inc., model VC-134), into a warm (50° C.) ammonium bicarbonate water solution (1 mol) at a constant rate under vigorous stirring and with ultrasonication (Branson model B-3510DTH ultrasonic bath at about 20 kHz). Stirring of the reaction mixture was continued for an additional hour after addition of the nitrate solution.

The cooled mixture was filtered and washed with DI water. The wet precursor cake was transferred to a beaker containing aprotic solvent (acetone) as a washing agent and the mixture was stirred or sonicated until a major portion of water was replaced with the washing agent. The washing with the aprotic solvent was performed twice, further washings being found to have little or no effect on the result.

The washed mixture was filtered and dried in an oven. The loosely packed powder cake obtained was ground with a pestle and mortar. The calcium and lanthanum carbonate nano-powder mixture formed was calcined at a temperature of 600° C. for 6 hours to decompose the carbonate. In cases where soft agglomerates formed, a mild milling was employed to break them into nano-powders.

The powder obtained was then sulfurized using hydrogen sulfide ($H_2S$) gas at 900° C. for 24 hours to form a powder predominantly (>98%) in the $CaLa_2S_4$ phase.

The BET surface area of the final CLS powder was about 100 $m^2/g$.

Figure 2:
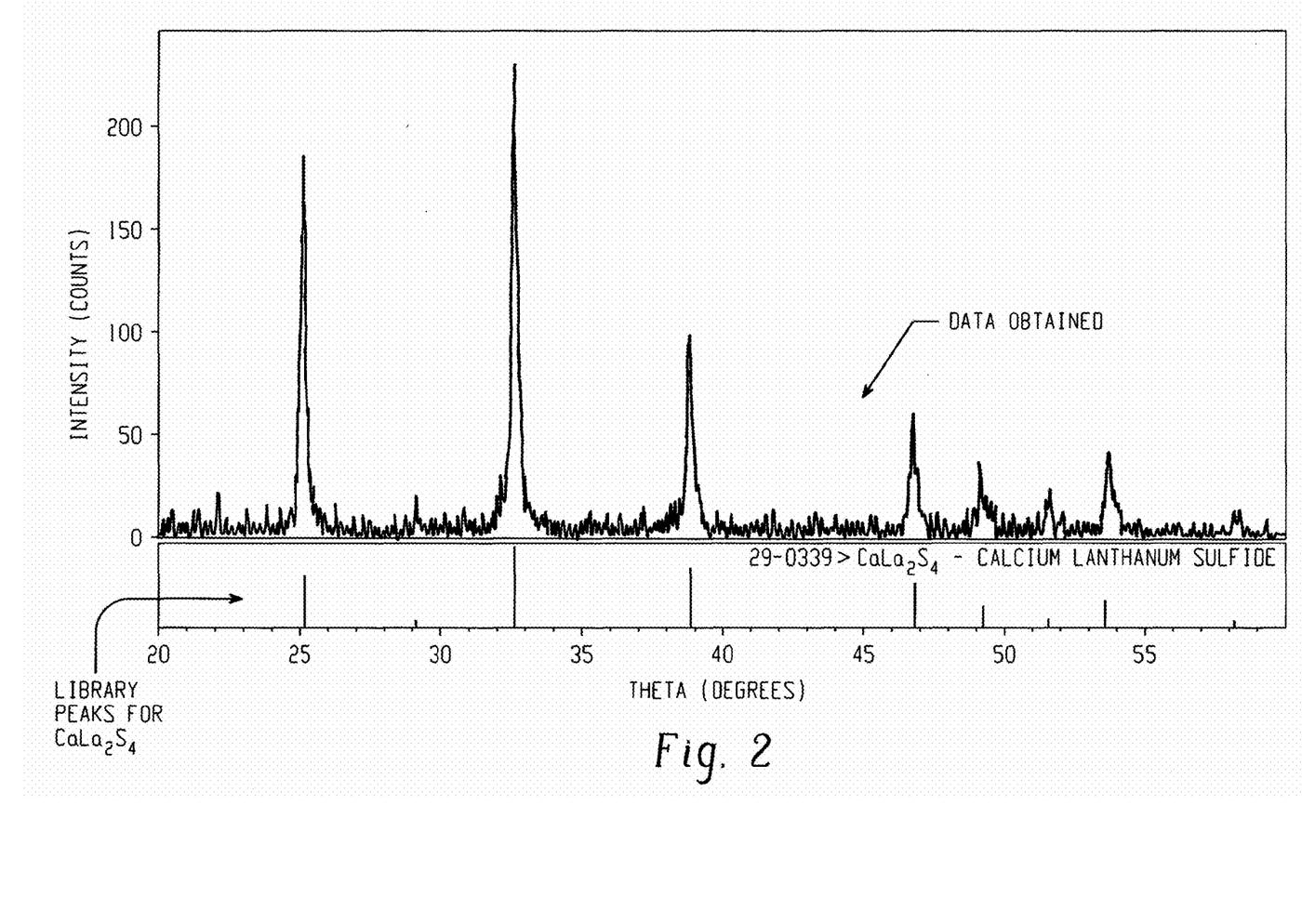
FIG. 2 shows X-ray powder diffraction data showing formation of $CaLa_2S_4$ phase.

FIG. 2 shows an x-ray diffraction pattern for the CLS phase. As can be seen, the peaks correspond to the CLS phase. The x-ray diffraction analysis showed that the powder is all single phase CLS. CaS and lanthanum oxysulfide ($La_2O_2S$), by comparison, have their most intense peaks at 31.4 degrees two-theta and 28.5 degrees two theta, respectively.

Figure 3:
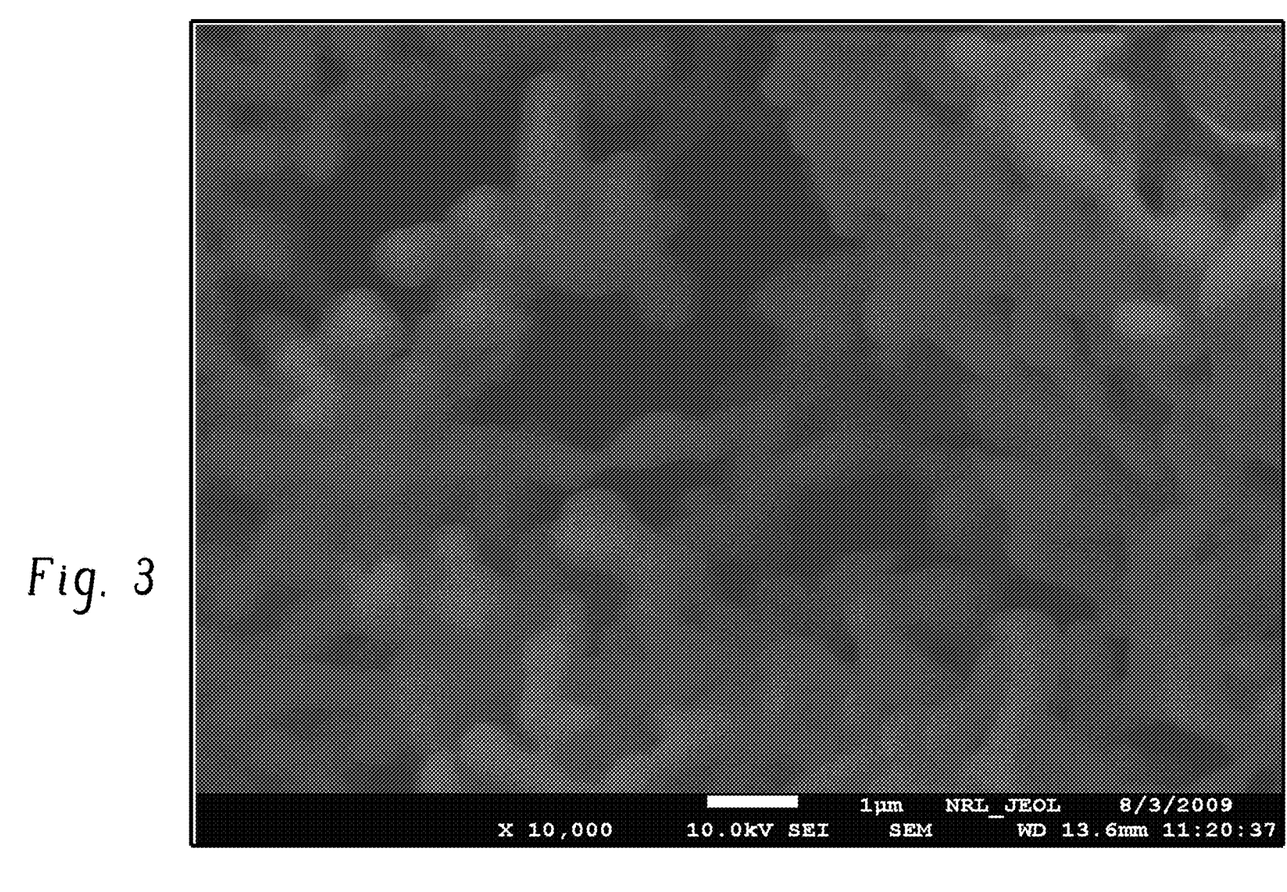
FIG. 3 is a scanning electron micrograph showing nanoparticles of CLS powder in accordance with the exemplary embodiment.

FIG. 3 shows the powder morphology of the CLS powder formed. The chemical analysis of the CLS powder obtained by this method is shown in Table 1. The powder 22 has an impurity content less than 50 ppm (actual total from Table 1=41 ppm), and the carbon content is less than 200 ppm.

TABLE 1

Chemical analysis of CLS powder by GDMS showing impurity content

| Element | Concentration [ppm by wt] |
|---|---|
| Li | 0.29 |
| Be | <0.05 |
| B | <0.05 |
| C | 170 |
| N | — |
| O | — |
| F | <5 |
| Na | 4 |
| Mg | 0.62 |
| Al | 1.9 |
| Si | 20 |
| P | <0.1 |
| S | Matrix |
| Cl | 1 |
| K | <0.5 |
| Ca | Matrix |
| Sc | <0.05 |
| Ti | 0.7 |
| V | <0.05 |
| Cr | 0.17 |
| Mn | 0.09 |
| Fe | 2.6 |
| Co | 0.22 |
| Ni | 0.34 |
| Cu | 0.12 |
| Zn | <0.05 |
| Cs | <0.1 |
| Ba | 2.2 |
| La | Matrix |
| Ce | <0.1 |
| Tl | <0.05 |
| Pb | <0.5 |
| Bi | <0.1 |

Example 2

Formation of CLS Nanopowder by Co-Precipitation

A procedure of Example 1 can be used except that the mixed solution of calcium nitrate and lanthanum nitrate ($Ca^{2+}/La^{3+}=1:2$) is dropped into a warm ammonium oxalate solution to precipitate calcium and lanthanum oxalate. The rest of the procedure can be as for Example 1.

Example 3

Formation of CLS Nanopowder by Separate Precipitation

The procedure of Example 1 can used except that separate solutions of calcium nitrate and lanthanum nitrate were separately precipitated into ammonium oxalate. This example is similar to Example 2 with the difference that calcium and lanthanum oxalates are precipitated separately. Fine particles of calcium oxalate are precipitated at a pH of about 4 and fine powders of lanthanum oxalate are precipitated at a pH of about 1.

The calcium and lanthanum oxalate nanopowders formed are then mixed in 1:2 molar ratio of Ca:La and ball milled together using $ZrO_2$ grinding media in ethanol for 6 hours. After ball milling, the powder slurry is separated from the grinding media and centrifuged to separate ethanol from the powder. After removing the ethanol, the powder is dried in an oven for 48 hrs. The mixed oxalate powder is then calcined at a temperature between 400° C. and 900° C. to burn off carbon. In cases where soft agglomerates are formed, a mild milling is employed to break them into nano-powders. The powder obtained is then sulfurized using hydrogen sulfide ($H_2S$) gas at 1000° C. for 6 to 24 hours to form powder predominantly in the $CaLa_2S_4$ phase.

Example 4

Formation of CGS Nanopowder by Co-Precipitation

The method of Example 1 is followed, except that gadolinium nitrate solution is used to make CGS nanopowder. The powder 22 can have an impurity content of less than 50 ppm and a carbon content of less than 200 ppm.

Example 5

Formation of CGS Nanopowder by Co-Precipitation

The method of Example 2 can be followed except that gadolinium nitrate solution is used to make CGS nanopowder.

Example 6

Formation of CGS Nanopowder by Separate Precipitation

The method of Example 3 can be followed except that gadolinium nitrate solution is used to make CGS nanopowder.

Example 7

Formation of CGS Nanopowder by Flame Spray Pyrolysis

Figure 4:
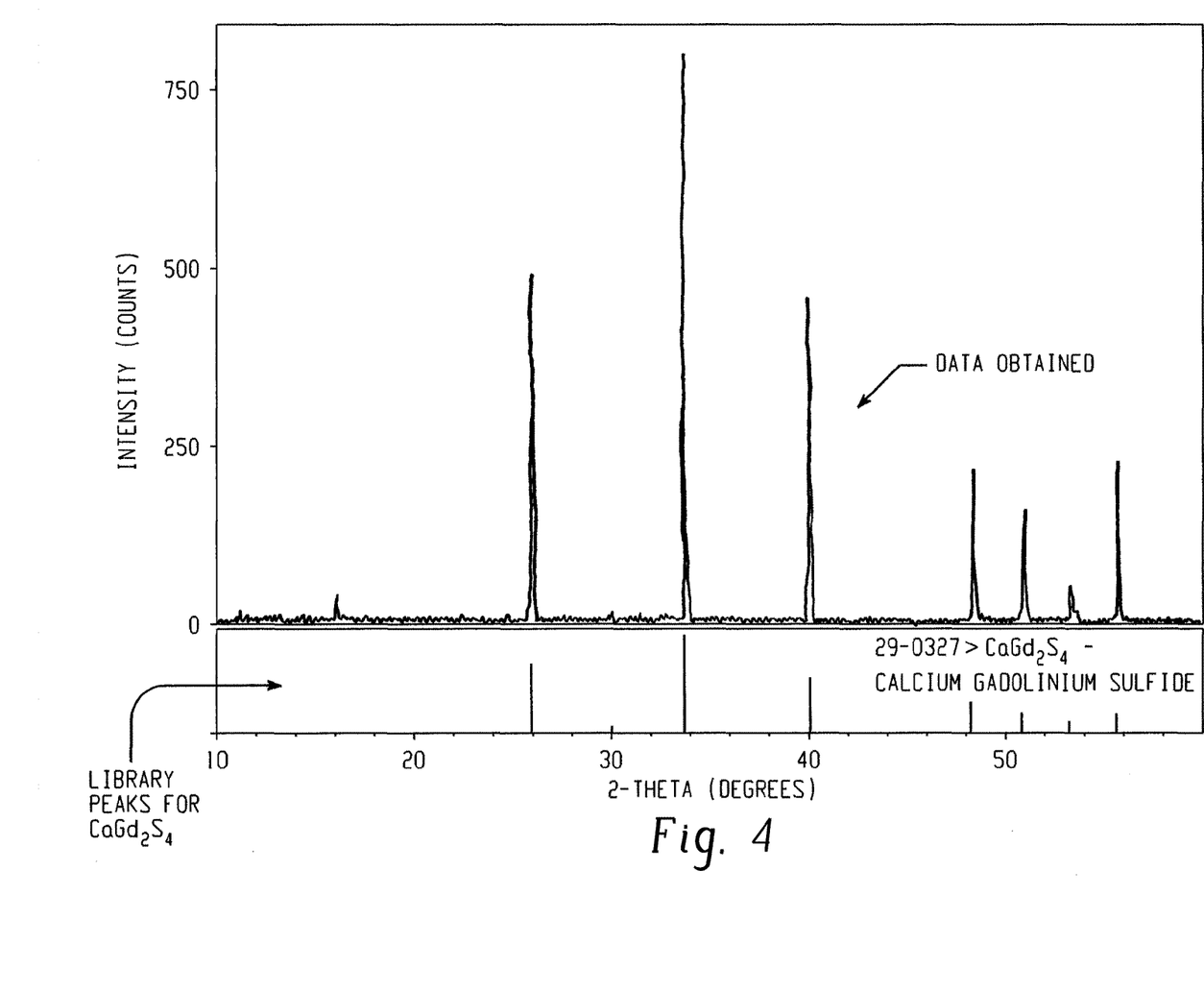
FIG. 4 shows X-ray powder diffraction data showing formation of $CaGd_2S_4$ phase by a flame pyrolysis method.

Flame Spray Pyrolysis was employed to prepare $CaGd_2S_4$ nanopowders. Calcium oxide (or calcium sulfate) and gadolinium oxide were dissolved in propionic acid to make the precursor solution containing propionates of $Ca^{2+}/Gd^{3+}$ in a cation ratio of 1:2. Chemicals of purity greater than 99.0% were purchased from Aldrich Chemicals, except as otherwise mentioned, and used as received. $CaGd_2O_4$ nanoparticles were synthesized from this Ca and Gd propionate solution using a flame spray pyrolysis machine (NPS10, Tethis, Italy). Oxygen and mixture of methane and oxygen were used as dispersion gas and supporting flame gas, respectively. A typical precursor solution flow rate was 1 ml/min. Nanopowders of $CaGd_2O_4$ with average particle size of <100 nm were obtained from the collection filter. The powder obtained was then sulfurized using hydrogen sulfide ($H_2S$) gas at 900° C. for 24 hours to form a powder in the $CaGd_2S_4$ phase. FIG. 4 shows x-ray diffraction data showing the formation of $CaGd_2S_4$ phase formed using calcium oxide.

Example 8

Formation of CLS Nanopowder by Flame Spray Pyrolysis

Flame Spray Pyrolysis was employed to prepare $CaLa_2S_4$ nanopowders. Calcium oxide (or Calcium sulfate) and lanthanum oxide were dissolved in propionic acid to make a precursor solution containing $Ca^{2+}/La^{3+}$ in a ratio of 1:2. Chemicals of a purity greater than 99.0% were purchased from Aldrich Chemicals, except as otherwise mentioned, and used as received.

Figure 5:
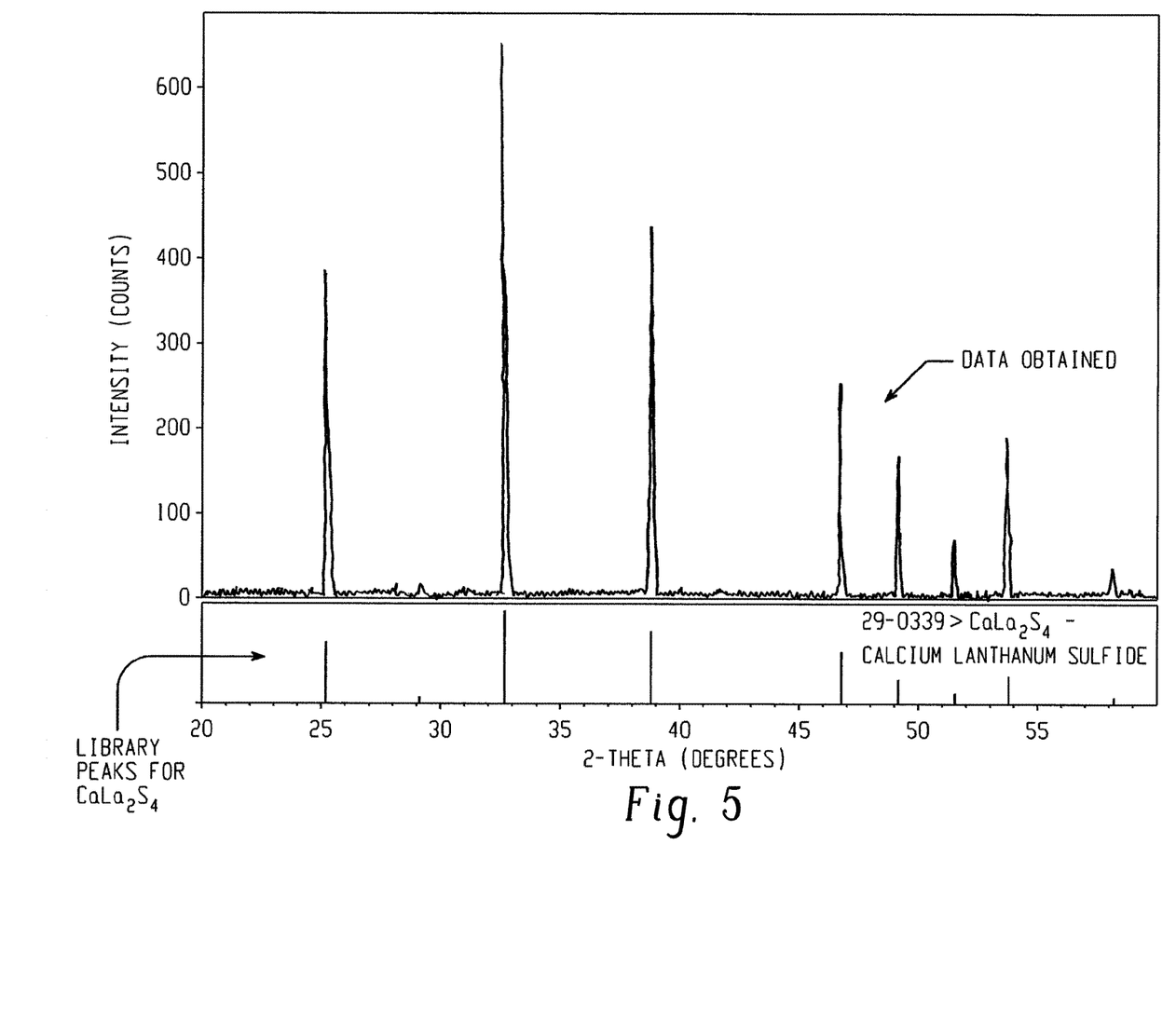
FIG. 5 shows X-ray powder diffraction data showing formation of $CaLa_2S_4$ phase by a flame pyrolysis method.

$CaLa_2O_4$ nanoparticles were synthesized from this Ca and La propionate solution using a flame spray pyrolysis machine (NPS10, Tethis, Italy). Oxygen and mixture of methane and oxygen were used as dispersion gas and supporting flame gas, respectively. A typical precursor solution flow rate was 1 ml/min. Nanopowders of $CaLa_2O_4$ with average particle size of <100 nm were obtained from the collection filter. The powder obtained was then sulfurized using hydrogen sulfide ($H_2S$) gas at 900° C. for 24 hours to form a powder in the $CaLa_2S_4$ phase. Typically BET surface area of the final CLS powder is in the range of 200 m²/g. FIG. 5 shows the x-ray diffraction pattern for the CLS phase.

Example 9

Formation of a Ceramic Body from CLS Nanopowder

The CLS nano-powder obtained in Example 8 was pressed into a disc shape with 2 Kpsi using a dry press and stainless steel die. The pressed disc was sintered in flowing $H_2S$ gas at 1400° C. for 48 hours. The sintered sample was hot isostatic pressed at 1300° C. and 28 Kpsi. The CLS ceramic obtained was polished to form a transparent clear body.

Example 10

Formation of CLS Nanopowder by Flame Spray Pyrolysis

The procedure of Example 8 can be followed except that the calcium $CaLa_2O_4$ nanoparticles are first synthesized from a mixed precursor solution of calcium nitrate and lanthanum nitrate ($Ca^{2+}/La^{3+}$=1:2) in ethanol.

Example 11

Formation of CLS Nanopowder by Flame Spray Pyrolysis

The procedure of Example 7 can be followed except that the calcium $CaGd_2O_4$ nanoparticles are first synthesized from a mixed precursor solution of calcium nitrate and gadolinium nitrate ($Ca^{2+}/Gd^{3+}$=1:2) in ethanol.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of preparing a fine powder of calcium lanthanoid sulfide comprising:
   forming a precipitate comprising insoluble calcium and lanthanoid salts by spraying soluble calcium and lanthanoid salts into at least one bath comprising a precipitating solution while simultaneously applying ultrasonic energy to each bath;
   oxidizing the precipitate, wherein the oxidizing of the precipitate comprising insoluble soluble calcium and lanthanoid salts is performed at a temperature of less than 900° C.; and
   sulfurizing the oxidized precipitate to form a fine powder of calcium lanthanoid sulfide.

2. The method of claim 1, further comprising washing the precipitate comprising insoluble calcium and lanthanoid salts with an aprotic solvent.

3. The method of claim 2, wherein the aprotic solvent comprises at least one of acetone, dioxane, and tetrahydrofuran.

4. The method of claim 1, wherein the oxidized precipitate is milled to reduce agglomeration of particles.

5. The method of claim 1, wherein the spraying includes atomizing soluble calcium and lanthanoid salts in solution to form fine droplets of 1-20 µm average size in diameter.

6. The method of claim 1, wherein the soluble calcium salt is sprayed into a first precipitating solution to form a precipitate comprising an insoluble calcium salt and the soluble lanthanoid salt is sprayed into a second precipitating solution to form a precipitate comprising an insoluble calcium salt.

7. The method of claim 6, further comprising milling the insoluble calcium salt and insoluble lanthanoid salt together.

8. The method of claim 1, wherein the precipitating solution includes at least one of an oxalate, oxalic acid, a carbonate, and a bicarbonate.

9. The method of claim 1, wherein the lanthanoid is selected from lanthanum, gadolinium, and combinations thereof.

10. The method of claim 1, wherein the fine powder comprises at least one of:
    an impurity concentration of less than 100 ppm;
    a carbon concentration of less than 200 ppm;
    a BET surface area of at least 50 m²/g; and
    an average particle size of less than 100 nm.

11. A calcium lanthanoid sulfide powder formed by the method of claim 1.

12. The calcium lanthanoid sulfide powder of claim 11, comprising at least one of:

an impurity concentration of less than 100 ppm;

a carbon concentration of less than 200 ppm;

a BET surface area of at least 50 $m^2/g$; and an average particle size of less than 100 nm.

13. A method of preparing a fine powder of calcium lanthanoid sulfide comprising:

forming a precipitate comprising insoluble calcium and lanthanoid salts by spraying soluble calcium and lanthanoid salts into at least one bath comprising a precipitating solution while simultaneously applying ultrasonic energy to each bath;

oxidizing the precipitate; and sulfurizing the oxidized precipitate to form a fine powder of calcium lanthanoid sulfide, wherein the sulfurizing includes heating the oxidized precipitate in the presence of at least one of hydrogen sulfide and carbon disulfide.

14. The method of claim 13, further comprising washing the precipitate comprising insoluble calcium and lanthanoid salts with an aprotic solvent.

15. The method of claim 13, wherein the spraying includes atomizing soluble calcium and lanthanoid salts in solution to form fine droplets of 1-20 μm average size in diameter.

16. The method of claim 13, wherein the soluble calcium salt is sprayed into a first precipitating solution to form a precipitate comprising an insoluble calcium salt and the soluble lanthanoid salt is sprayed into a second precipitating solution to form a precipitate comprising an insoluble calcium salt.

17. The method of claim 13, wherein the precipitating solution includes at least one of an oxalate, oxalic acid, a carbonate, and a bicarbonate.

18. The method of claim 13, wherein the lanthanoid is selected from lanthanum, gadolinium, and combinations thereof.

19. A calcium lanthanoid sulfide powder formed by the method of claim 13.

20. The calcium lanthanoid sulfide powder of claim 19, comprising at least one of:

an impurity concentration of less than 100 ppm;

a carbon concentration of less than 200 ppm;

a BET surface area of at least 50 $m^2/g$; and an average particle size of less than 100 nm.

* * * * *